(12) United States Patent
Wang

(10) Patent No.: US 10,230,130 B2
(45) Date of Patent: Mar. 12, 2019

(54) THIN FILM LITHIUM-ION BATTERY

(71) Applicant: GAMC Biotech Development Co., LTD., New Taipei (TW)

(72) Inventor: Chia-Gee Wang, New York, NY (US)

( * ) Notice: Subject to any disclaimer, the term of this patent is extended or adjusted under 35 U.S.C. 154(b) by 396 days.

(21) Appl. No.: 13/671,565

(22) Filed: Nov. 8, 2012

(65) Prior Publication Data

US 2013/0115507 A1    May 9, 2013

Related U.S. Application Data

(60) Provisional application No. 61/557,365, filed on Nov. 8, 2011.

(30) Foreign Application Priority Data

Nov. 7, 2012 (TW) .............................. 101141446 A

(51) Int. Cl.
| | |
|---|---|
| H01M 10/0525 | (2010.01) |
| H01M 4/36 | (2006.01) |
| H01M 4/38 | (2006.01) |
| H01M 4/587 | (2010.01) |
| H01M 10/0562 | (2010.01) |
| H01M 10/0585 | (2010.01) |
| H01M 10/04 | (2006.01) |

(52) U.S. Cl.
CPC ....... *H01M 10/0525* (2013.01); *H01M 4/366* (2013.01); *H01M 4/386* (2013.01); *H01M 4/587* (2013.01); *H01M 10/0562* (2013.01); *H01M 10/0585* (2013.01); *H01M 10/0436* (2013.01)

(58) Field of Classification Search
CPC .. H01M 10/0525; H01M 4/366; H01M 4/386; H01M 4/587; H01M 10/0562; H01M 10/0585; H01M 10/0436
See application file for complete search history.

(56) References Cited

U.S. PATENT DOCUMENTS

| | | | |
|---|---|---|---|
| 2002/0015890 A1* | 2/2002 | Nakura | 429/231.95 |
| 2002/0071989 A1* | 6/2002 | Verma et al. | 429/176 |
| 2006/0063072 A1 | 3/2006 | Li et al. | |
| 2007/0012244 A1* | 1/2007 | Klaassen | B32B 15/08 |
| | | | 118/75 |

(Continued)

FOREIGN PATENT DOCUMENTS

| | | |
|---|---|---|
| TW | 200919803 | 5/2009 |
| TW | 201114094 | 4/2011 |

OTHER PUBLICATIONS

Yong et al, "Binding Graphene Sheets Together using Silicon: Graphene/Silicon Superlattice", published online Feb. 13, 2010, p. 805-806.*

(Continued)

*Primary Examiner* — Sarah A. Slifka
*Assistant Examiner* — Brian R Ohara
(74) *Attorney, Agent, or Firm* — JCIPRNET

(57) ABSTRACT

The present invention is directed to a thin film lithium-ion battery having at least a laminate structure therein. The laminate structure includes a bottom current collector layer, an anode consisting of a superlattice layer and a silicon based layer, an electrolyte and separator, a cathode and a top current collector layer sequentially stacked together. The electrolyte and separator of the laminate structure contains lithium ions.

4 Claims, 2 Drawing Sheets

(56) References Cited

U.S. PATENT DOCUMENTS

| | | | |
|---|---|---|---|
| 2007/0148544 A1* | 6/2007 | Le | B22F 9/002 |
| | | | 429/218.1 |
| 2009/0297952 A1* | 12/2009 | Yasunaga | H01M 4/02 |
| | | | 429/231.8 |
| 2010/0190062 A1* | 7/2010 | Yamamoto et al. | 429/231.95 |
| 2010/0233548 A1* | 9/2010 | Pijnenburg et al. | 429/322 |
| 2011/0256451 A1* | 10/2011 | Cui | B32B 5/26 |
| | | | 429/218.1 |
| 2012/0045688 A1* | 2/2012 | Liu et al. | 429/207 |
| 2013/0089790 A1* | 4/2013 | Byon | H01M 4/133 |
| | | | 429/231.8 |
| 2014/0170483 A1* | 6/2014 | Zhang | H01M 4/0428 |
| | | | 429/211 |

OTHER PUBLICATIONS

Bond Dissociation Energies Table 4.11, Properties of Atoms, Radicals and Bonds, p. 4.50.*

Bond Dissociation Energies Table 4.11, Properties of Atoms, Radicals and Bonds, p. 4.50 (Year: 1990).*

Tao et al., "Si-Based Materials as the Anode of Lithium-Ion Batteries," Progress in Chemistry, Mar. 2011, pp. 318-327.

"Office Action of Taiwan Counterpart Application", dated Apr. 7, 2014, p. 1-5.

* cited by examiner

THIN FILM LITHIUM-ION BATTERY

CROSS-REFERENCE TO RELATED APPLICATION

This application claims the priority benefits of U.S. provisional application Ser. No. 61/557,365, filed on Nov. 8, 2011 and Taiwan application serial no. 101141446, filed on Nov. 7, 2012. The entirety of each of the above-mentioned patent applications is hereby incorporated by reference herein and made a part of this specification.

BACKGROUND OF THE INVENTION

1. Field of the Invention

The present invention generally relates to a battery. More particularly, the present invention relates to a thin film lithium-ion battery.

2. Description of Related Art

Lithium-ion batteries are one of the most popular types of the rechargeable battery for portable electronics. Following the development of the solid electrolyte that fulfils both functions of the electrolyte and the separator, the thin film lithium-ion batteries with a silicon-based anode and a carbon nanotube-based cathode have been put into practice. One main drawback of the Si-based anode is the notable volume change during the lithium incorporation/release process, which results in rapid capacity fading during initial cycling.

SUMMARY OF THE INVENTION

The present invention is directed to a thin film lithium-ion battery having at least a laminate structure incorporating at least a structurally stable silicon-based superlattice anode. Such battery offers a large gravimetric capacity, a high cyclability and a high battery loading/charging capacity rate (i.e. C-rate).

The present invention provides a thin film lithium-ion battery having at least a laminate structure therein. The laminate structure includes a bottom current collector layer, an anode consisting of a superlattice layer and a silicon based layer, an electrolyte and separator, a cathode and a top current collector layer sequentially stacked together. The electrolyte and separator of the laminate structure contains lithium ions.

In order to make the above and other features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Common reference numerals are used throughout the drawings and the detailed description to indicate the same elements. The present invention will be more apparent from the following detailed description taken in conjunction with the accompanying drawings.

DESCRIPTION OF THE EMBODIMENTS

The present invention is directed to a thin film lithium-ion battery having at least a laminate structure incorporating at least a structurally stable silicon-based superlattice anode. Taking advantage of the silicon-based superlattice anode, the battery offers a large gravimetric capacity, a high cyclability and a high battery loading/charging capacity rate (i.e. C-rate).

Figure 1:
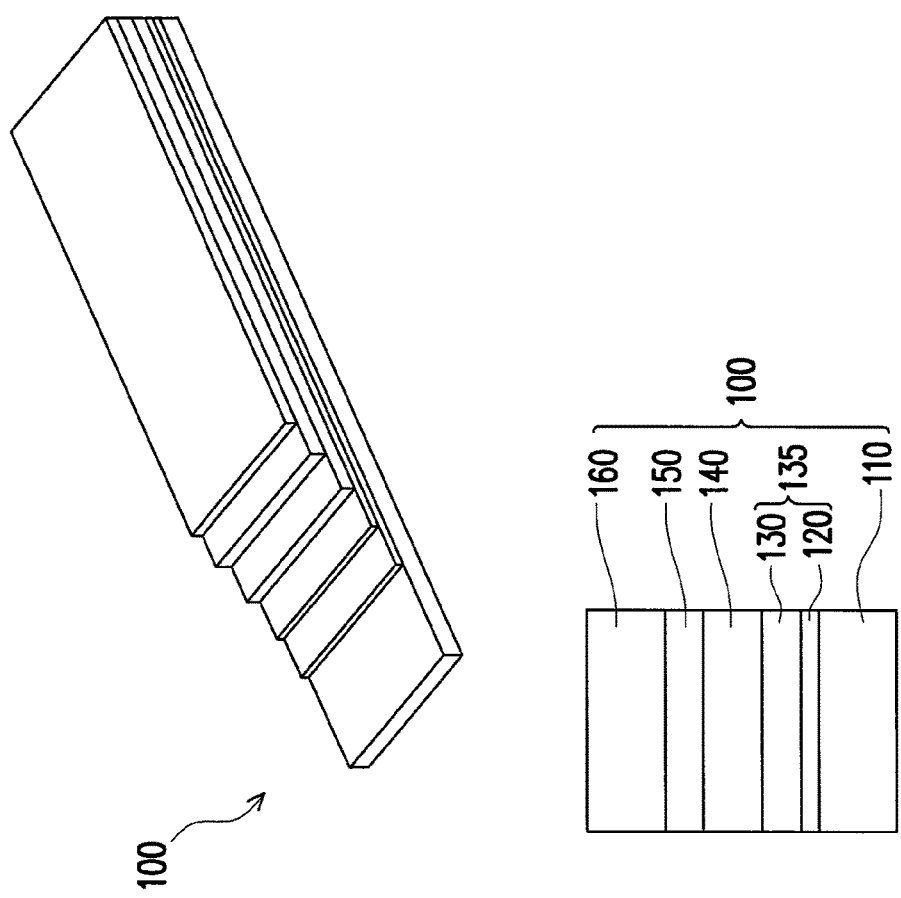
FIG. 1 is a schematic display of a laminate structure for the thin film battery according to an embodiment of this invention.

FIG. 1 is a schematic display of a laminate structure for the thin film battery according to an embodiment of this invention. The upper part of FIG. 1 shows a three-dimensional view of the laminate structure 100, while the lower part of FIG. 1 shows a schematic cross-sectional view of the laminate structure 100. The thin film battery includes at least a laminate structure 100 consisting of a bottom current collector layer 110, a superlattice layer 120, a silicon based layer 130, an electrolyte and separator (electrolyte/separator) 140, a cathode 150 and a top current collector layer 160, sequentially. The superlattice layer 120 and the silicon based layer 130 forms the anode 135. For example, the anode 135 is composed of supperlattice Si/C and silicon. High C rating calls for large anode area, and it can be achieved by etching the superlattice Si/C with hills and valleys as well as depositing the silicon on Si/C and etching the silicon into porous-silicon. In fact, without the Si/C, the base of porous-silicon would be invaded by Li-ion and become pulverized during charging.

When the battery is charged, electrons flow from the anode to cathode, and meanwhile positive lithium ions (Li ions) flow from the cathode to the anode; and contrariwise during discharged.

The battery structure shown in FIG. 1 is merely a schematic display and the outer protective coating or packaging material is omitted for the description conveniences. However, it is understood that the common filling, covering, shielding or packaging parts of the battery may be applicable and may be added to the structure of the thin film battery structure in this invention.

The material of the top and the bottom current collector layers 110, 160 may be an ion-conductive polymer. The separator sold by Cellgard, for example, is a ion-conductive polymer. The material of the top and the bottom current collector layers 110, 160 may be the same or different. The thickness of the top or the bottom current collector layers 110, 160 may be about 12 microns, for example.

The material of the cathode 150 may be carbon nanotubes (CNT), preferably carboxylic acid functionalized carbon nanotubes (i.e. CNTs with COOH groups), for example. The electrolyte/separator 140 may be made from lithium phosphorus oxynitride (LiPON), an amorphous polymer material. For example, a plurality of LiPON layers is deposited over the cathode material at ambient temperatures by RF magnetron sputtering. The polymer material of the electrolyte/separator 140 may be gel-like solid material, so that the electrolyte/separator 140 conforms to the shape of the battery package.

In fact, the electrolyte/separator 140 functions as the solid electrolyte, the binder and the separator simultaneously. Instead of having three different components, this design of the electrolyte/separator 140 increases the overall energy density of the assembled battery as the constituents of the entire cell are more tightly packed. This solid electrolyte/ separator 140 is responsible for the ion conduction between the anode and the cathode and for maintaining a physical separation between the anode and cathode materials in order to prevent short-circuiting.

"Superlattice" generally refers to a periodic structure of layers of two (or more) materials. The superlattice layer 120 is a silicon-carbon (Si/C) superlattice layer. Si/C superlattice has a bonding similar to silicon carbide at 375 kJ/mole, much higher than Si—Si at 25 kJ/mole, and thus prevents Li-ion from diffusing through. This Si/C superlattice layer 120 may function as a conductive buffer layer and conductive contact for the anode 135. This Si/C superlattice layer primarily functions as a diffusion barrier for Li-ions because the bonding strength of Si—C and C—C bonds (having bond-dissociation energy at about 375 kJ/mole) in the Si/C superlattice is large enough to prevent the Li-ions from diffusing through the anode, which seriously degrades the integrity of the anode. With this Si/C superlattice layer, the benefits of silicon nanostructuring in the silicon-based anode, such as nanoscale volume confinement and short distances for lithium conduction, are retained, and thus the obtained battery offers fast electron conduction and very fast charge/discharge rates. As the epitaxial Si/C superlattice is an ultra-stable material, the silicon-based superlattice anode 135 of this invention is highly resistant to fracturing and structurally stable.

Silicon carbide (SiC) is an epi-compound that requires a very highly elevated temperature (1800° C.) for deposition and such a high temperature forbids the use of the silicon substrate that has a melting point of 1414° C. On the other hand, the Si/C superlattice may be epitaxially fabricated on the common silicon substrate. The Si/C superlattice layer may be fabricated in a layer-by-layer way using the molecular beam epitaxy (MBE) technology at low temperature and monitored by RHEED (reflection high energy electron diffraction) image in real time followed by annealing at an elevated temperature for surface mobility to take place. However, such technology requires quite long time for reaching a functional thickness. Instead, new atomic layer deposition (ALD) technology of higher throughputs (5-6 orders of the magnitude) has been developed specifically for the fabrication of the Si/C superlattice. The ALD technology takes advantages of the self-limiting surface chemistry, and the repetitive gaseous depositions applied in millisecond pulses achieve a uniform surface coverage, and the annealing and cooling are conducted between the pulses. Hence, the fabrication time for each layer by the ALD technology is significantly reduced to sub-second levels, which greatly enhances the practicality of commercial scale production using the ALD technology. Another advantage of using the Si/C superlattice formed by a layer-by-layer fashion lies in that the superlattice layer may be terminated with a silicon surface in order to accommodate the construction of silicon matrix and etch into the porous silicon for the anode structure.

The silicon based layer 130 is a porous-silicon layer. The porous-silicon layer is a silicon layer etched with holes by using acids. In general, using acids of different acid strength delivers different porosity to the silicon layer to be etched, and the acid used for etching silicon may be stopped by the Si/C. The etching of Si/C is done first, then deposit Si and later perform a mild etch to obtain porous-silicon.

The fabrication of the laminate structure for the thin film battery cell is started by providing a silicon substrate, such as a silicon wafer, and then followed by forming the superlattice layer on the silicon substrate, forming the silicon based layer and the adding the solid electrolyte/separator and the cathode. Afterwards, laminate structure is transferred from the silicon substrate to a flexible substrate or support. During this procedure, chemical etching may be firstly performed to separate the laminate structure from the silicon substrate, and the laminate structure may be transferred to the flexible support using lift-off or transfer printing technology. The Si/C superlattice layer can prevent the anode and the other laminated layers from being damaged by the etching solution. In addition, chemical etching, especially acid etching, may results in the increase of the surface area of the Si/C superlattice by generating a lot of minute pores into the Si/C superlattice, thus further increasing the charge capacity of the battery cell. The material of the flexible support may be either transparent or semi-transparent conductive polymer material. The laminate structure may be stacked on the flexible support in a mono-face or bi-face flat configuration.

Figure 2:
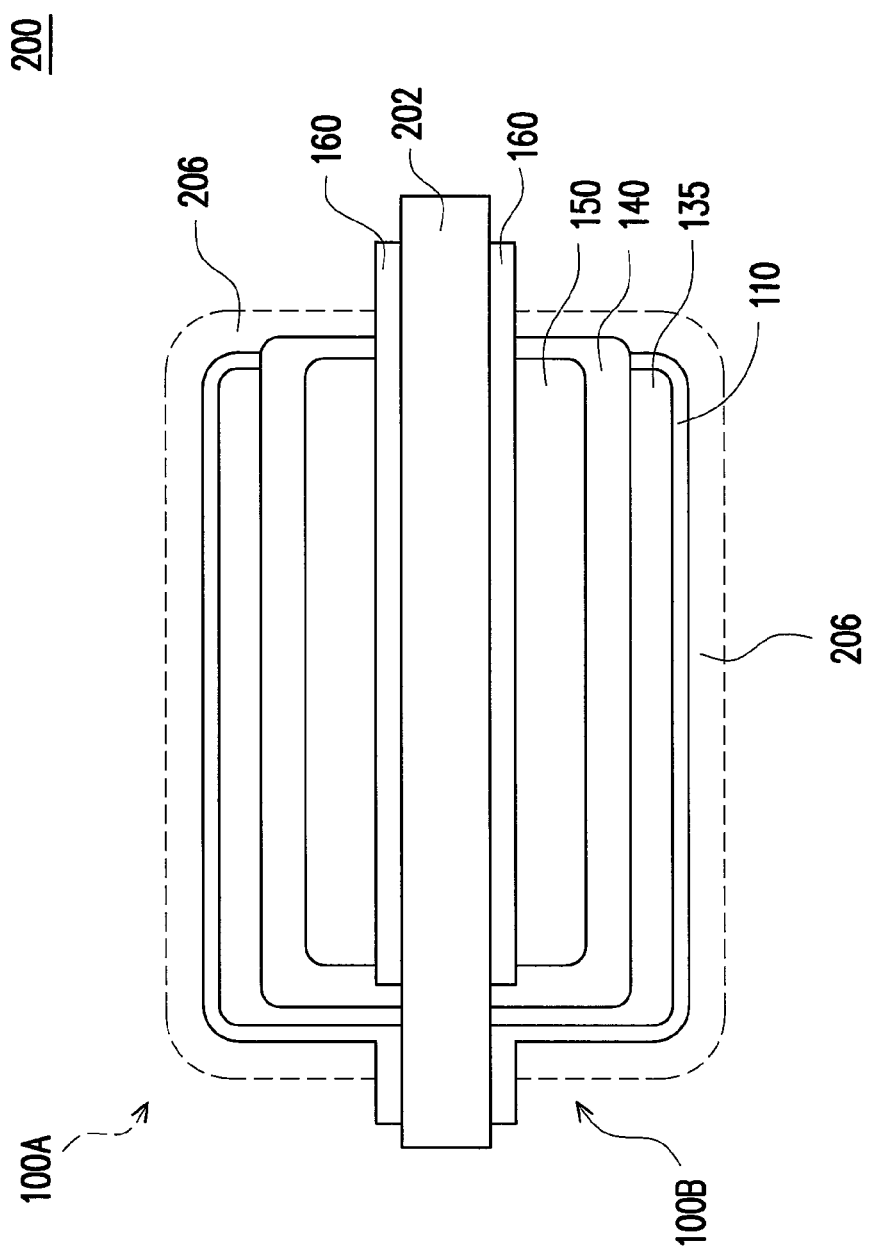
FIG. 2 is a schematic display of the thin film battery according to an embodiment of this invention.

FIG. 2 is a schematic display of the thin film battery according to an embodiment of this invention. As shown in FIG. 2, in the thin film battery 200, the flexible substrate 202 is located in the middle and both sides of the flexible substrate 202 are stacked with the laminate structures 100A, 100B. The laminate structures 100A, 100B are similar to the laminate structure 100 as described in FIG. 1 and the same reference numbers are used to represent the substantially the same or similar components or parts. The lower laminate structure 100B consisting of the current collector layer 110, the anode 135, the electrolyte and separator (electrolyte/separator) 140, the cathode 150 and the top current collector layer 160, sequentially from bottom to top, is stacked on the lower side of the flexible substrate 202. Similarly, the upper laminate structure 100A having the same laminated layers in the reverse sequence is stacked on the upper side of the flexible substrate 202. The upper and lower laminate structures 100A, 100B are further covered by the protective coating 206.

This advanced thin film lithium-ion battery has many potential applications in consumer electronic products and medical products. Because the thickness of the thin film lithium-ion batteries is relatively thin, these batteries may be used in portable products or implantable medical devices, such as defibrillators, neural stimulators, smart cards, radio frequency identification, RFID tags and wireless sensors. These thin film batteries may store energy collected from solar cells or other harvesting devices.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not be necessarily being drawn to scale. There may be distinctions between the artistic renditions in the present disclosure and the actual apparatus due to manufacturing processes and tolerances. There may be other embodiments of the present invention which are not specifically illustrated. The specification and the drawings are to be regarded as illustrative rather than restrictive. Modifications may be made to adapt a particular situation, material, composition of matter, method, or process to the objective, spirit and scope of the invention. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the invention.

What is claimed is:

1. A thin film lithium-ion battery, comprising:
   at least a laminate structure comprising:
   a bottom current collector layer;
   a superlattice layer disposed on the bottom current collector layer, wherein the superlattice layer is silicon-carbon superlattice layer having bond-dissociation energy at about 375 kJ/mole and with a silicon surface, the superlattice layer is terminated with a silicon surface, and a surface of the superlattice layer disposed on the bottom current collector layer is porous;
   a silicon based layer disposed on the silicon surface of the superlattice layer, wherein the silicon based layer is a porous silicon layer etched with holes by using acids, and the superlattice layer and the silicon-based layer constitute an anode of the battery;
   an electrolyte and separator disposed on and being in direct contact with the silicon based layer, wherein the anode is sandwiched in between the bottom current collector layer and the electrolyte and separator, and the electrolyte and separator contains lithium ions;
   a cathode disposed on the electrolyte and separator, wherein the electrolyte and separator is located between the cathode and the bottom current collector layer, and a material of the cathode includes carboxylic acid functionalized carbon nanotubes (CNTs with COOH groups); and
   a top current collector layer disposed on the cathode; and
   a flexible substrate for carrying the at least laminate structure, wherein the top current collector layer is stacked on and in direct contact with the flexible substrate.

2. The battery of claim 1, wherein a material of the electrolyte and separator is lithium phosphorus oxynitride (LiPON).

3. The battery of claim 1, wherein a material of the bottom or top current collector layer is a conductive polymer material.

4. The battery of claim 1, further comprising a protective coating covering the at least laminate structure and over the flexible substrate.

* * * * *